A. E. OSBORN.
POWER TRANSMITTING MECHANISM.
APPLICATION FILED MAY 11, 1910.
1,049,260.
Patented Dec. 31, 1912.
3 SHEETS—SHEET 2.
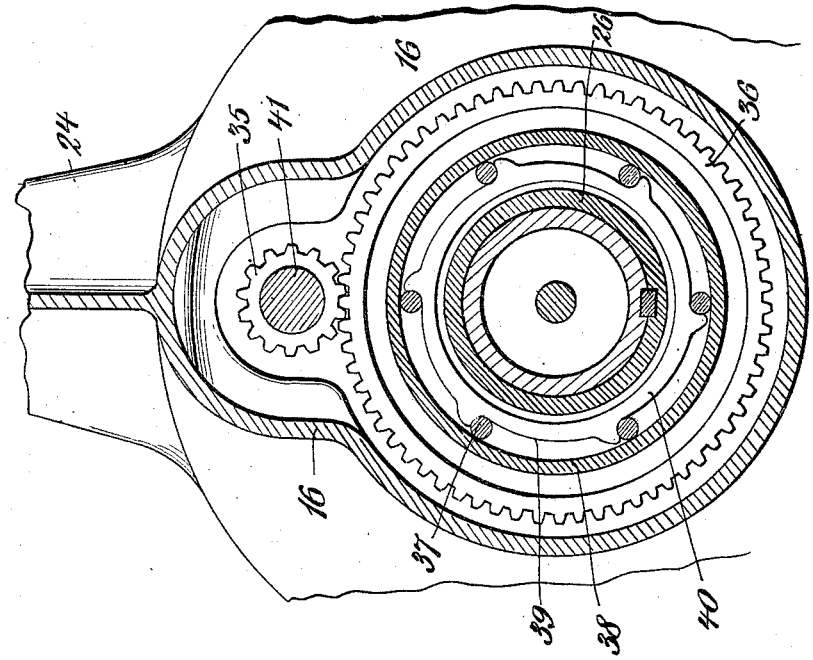
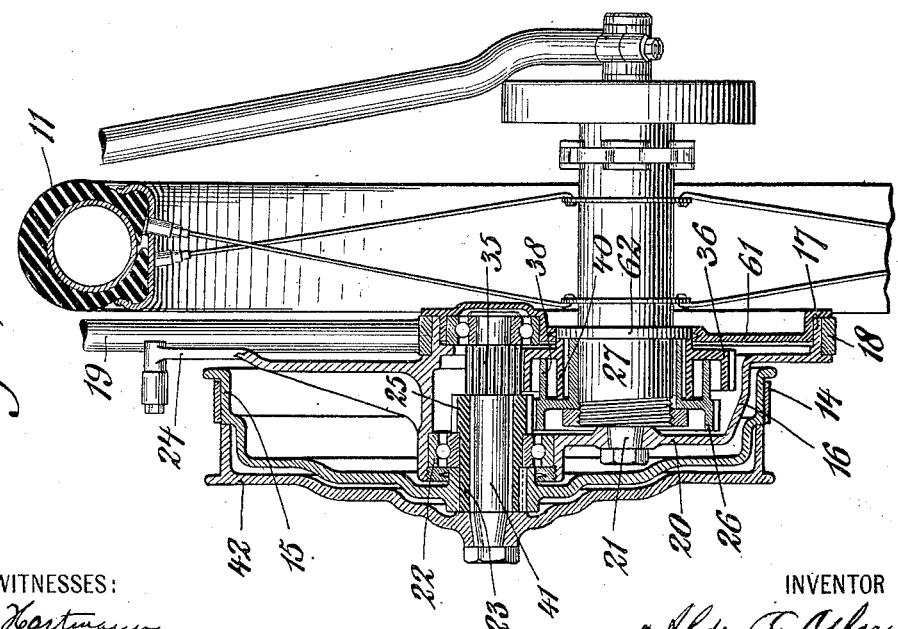
WITNESSES:
INVENTOR
BY
ATTORNEYS

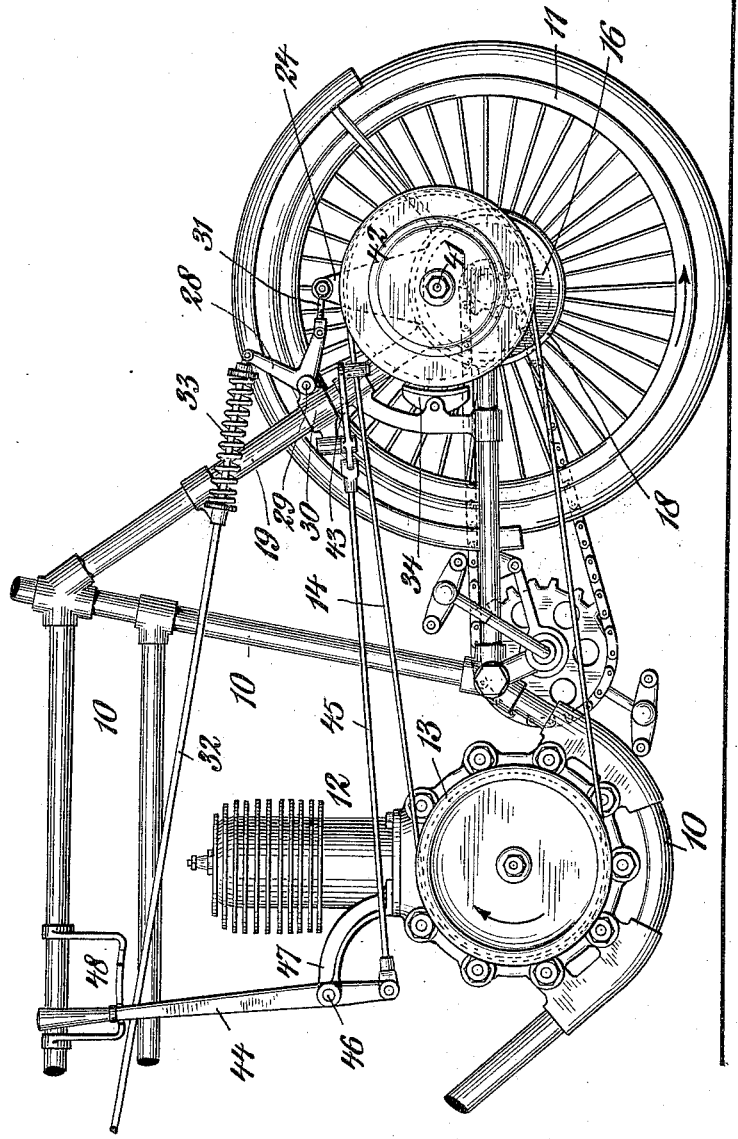

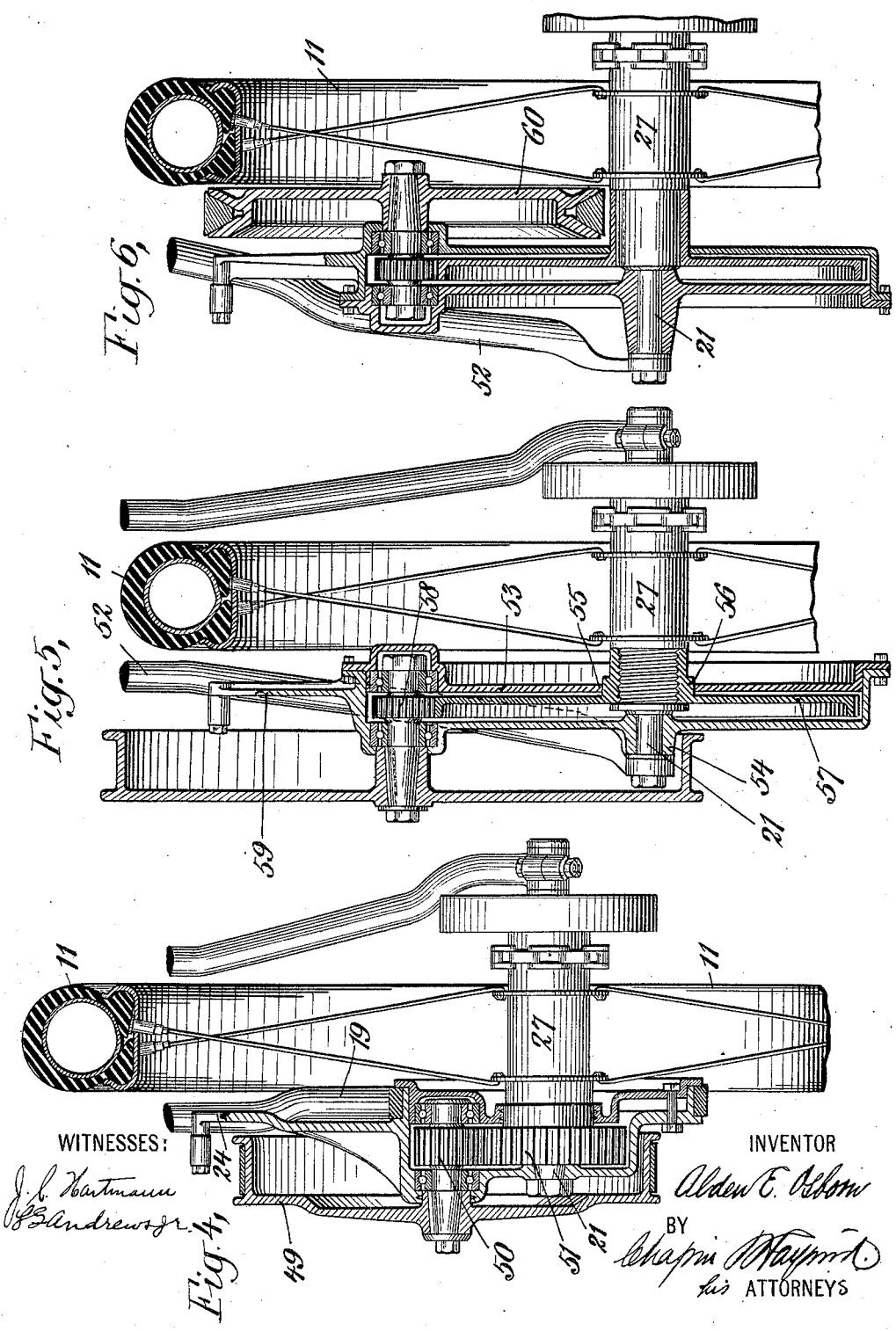

UNITED STATES PATENT OFFICE.

ALDEN E. OSBORN, OF NEW YORK, N. Y.

POWER-TRANSMITTING MECHANISM.

1,049,260.  Specification of Letters Patent.  Patented Dec. 31, 1912.

Application filed May 11, 1910. Serial No. 560,581.

*To all whom it may concern:*

Be it known that I, ALDEN E. OSBORN, a citizen of the United States of America, and a resident of the borough of Bronx, city, county, and State of New York, have invented certain new and useful Improvements in Power-Transmitting Mechanism, of which the following is a specification, reference being had to the accompanying drawings, forming a part thereof.

My invention relates to improvements in power transmitting means, and particularly to power transmitting means for motor cycles and similar vehicles.

The main objects of my invention are, first, to avoid the use of the small driving pulley usually employed for the driving element in motor cycles and similar vehicles; second, to provide a convenient, inexpensive, and efficient means for slackening and tightening the driving belt usually employed in this type of mechanism between the driving pulley and the driven mechanism, the purpose thereof being to release or establish driving connection therethrough; third, to provide an efficient form of brake which may be applied by the same operation employed in moving the parts to slacken the belt to release driving connection; fourth, to provide a simple, efficient, and inexpensive change speed gearing whereby two speeds of drive may be employed with little additional expense; fifth, to provide a construction wherein the belt which connects the motor with the driven parts passes to the exterior of the frame fork which supports the traction wheel, while still retaining the principle of the stationary rear axle; and last, generally to improve and simplify mechanism of this character, while rendering the same inexpensive to manufacture, efficient and reliable in operation, and easily controllable.

To these ends my invention consists in many novel features of construction and combinations of parts, such as will be fully pointed out hereinafter, and in order that my invention may be thoroughly understood, I will now proceed to describe certain structures constituting embodiments thereof, having reference to the accompanying drawings illustrating the same, and will then point out the novel features in claims.

In the drawings: Figure 1 is a view in side elevation of a motor cycle having a power transmitting mechanism constructed in accordance with my invention. Fig. 2 is a view in central vertical section through the power transmitting mechanism in a line with the axis of the rear wheel. Fig. 3 is a detail vertical section through the power transmitting mechanism, the plane of section being at right angles to the plane of section of Fig. 2. Figs. 4, 5 and 6 are vertical sections similar to Fig. 2 showing modified structures.

Referring first of all to Figs. 1, 2 and 3, the vehicle shown is substantially of the ordinary motor cycle type including a frame work 10, a front steering wheel, not shown, and a rear driving or traction wheel 11. Secured to the frame is a motor 12, the shaft of which carries a driving pulley 13. This driving pulley is shown as connected through the medium of a belt 14 with a driven pulley 15 mounted to rotate in a carrier 16 slidably supported in and by the rear portion of the machine frame. In the construction shown in Figs. 1, 2 and 3, this carrier is made in the form of a casing which is provided with a cylindrical head 17 fitted to a cylindrical hub 18 carried by one member 19 of the rear fork of the frame, and by which the carrier is supported, the said casing being provided with an outer wall 20, the central portion of which forms a support concentric with the head 17 for the rear axle 21 upon which the rear wheel 11 is mounted, and an inner wall 61 having a central cylindrical bore therethrough which finds a bearing upon the periphery of a flange 62 of the hub 27 of the vehicle wheel 11. The hub 23 of the driven pulley is mounted to rotate in suitable bearings in the carrier 16, disposed parallel with, but eccentric to, the axis of the hub 18 and the head 17, the latter said axis being coincident with the axis of rotation of the said vehicle wheel. The carrier 16 is also provided with an uprising arm 24 for a purpose to be presently described. Secured fast to the hub 23 of the pulley 15 is a pinion 25, the teeth of which are disposed in mesh with the teeth of a spur gear 26 mounted fast upon the hub 27 of the vehicle wheel 11. Driving movements of the motor in the direction of the arrow shown in Fig. 1 will be imparted through the medium of the belt 14 in the same direction to the pulley 15 and thence through the pinion 25 and spur gear 26 to the driving wheel 11 in the opposite direction, *i. e.* in the direction shown by the arrow thereon such being the proper direction for propelling the vehicle forward. The speed of these driving movements will, of course, be determined by the ratio of the spur and pinion, which in the example shown, is about 2½ to 1, and thus a proper reduction of speed will be obtained without the employment of a small driving pulley upon the motor as is usual and common in this class of mechanism.

I will now describe the means by which the transmission gearing may be disconnected from driving relation with the motor.

Remembering that the carrier 16 is mounted in the frame through the medium of the cylindrical head 17 and hub 18, it will follow that by making the connection a sliding fit, the said carrier may be given movements of rotation in the frame, and it will also follow that because the axis of the pulley 15 is mounted eccentrically with respect to the center of rotation of the carrier, such a rotative movement will move the pulley 15 toward and away from the pulley 13. With the parts in the positions shown in Fig. 1, the said carrier is adjusted so that the pulley 15 is moved to the limit of its position away from the pulley 13, and the belt 14 at such times is under driving tension. By imparting a movement of rotation to the carrier in an anti-clockwise direction as viewed in Fig. 1, the pulley 15 will be moved toward the pulley 13 and the belt 14 will be so slackened that it will not transmit driving movements, but will merely slip. These rotative movements may be imparted to the carrier by any suitable means and as a convenient means therefor, I have shown a bell crank lever 28 pivoted at 29 to a bracket 30 upon the fork element 19, a link 31 connecting one of the arms of the bell crank lever 28 with the carrier arm 24, and a connecting element 32 leading to the other arm of the bell crank lever 28 from a suitable point in the vehicle, preferably near the front thereof, whereby ready access may be had thereto by the rider. A spring 33 may be employed to normally throw the parts to the position in which they are shown in Fig. 1, in which case tension upon the connecting element 32 against the pressure of the spring 33 will rock the bell crank lever 28 upon its support to move the carrier to a position to release the belt 14. When tension upon the connecting element 32 is released, the spring 33 will return the parts to their normal positions, the link 31 and the arm of the bell crank lever in connection therewith acting in the nature of a toggle, thereby exerting a powerful action upon the carrier arm to move the carrier to its normal position, and holding the parts in their finally adjusted position very securely in place.

I conveniently employ a brake 34 in connection with the pulley 15, the said brake being carried by the frame and being disposed in such a position that after the belt 14 has been slackened sufficiently to release driving connection, a further movement of the carrier will cause the periphery of the pulley 15 to engage the said brake and so to effect a slowing down of the vehicle. The brake may be applied with the required degree of force by varying the tension upon the connecting element 32 as will be well understood.

In order to provide for two speeds of drive, I conveniently employ a second set of gearing, comprising a pinion 35 mounted upon the axle 41 of a second pulley 42, and a spur gear 36, the teeth of which are disposed in mesh with the teeth of the pinion 35, the said spur gear being adapted to be connected in driving relation with the hub 27 of the wheel 11. The ratio between the pinion 35 and the spur gear 36 is different from that between the pinion 25 and the spur gear 26. In the construction shown in Fig. 2, this ratio is about four to one, but it will, of course, be understood that the relative diameters of the several gear wheels are entirely a matter of choice. For the purpose of connecting the spur gear 36 in driving relation with the hub of the wheel 11, I have provided a uni-direction clutch such as may be of any convenient form, and which in the present case is shown as comprising rollers 37 disposed between the interior wall of a sleeve 38 carried by the spur gear 26 (and which it will be remembered is secured fast to the hub 27) and cam surfaces 39 upon a hub 40 of the said gear wheel 36. By shifting the driving belt 14 from its engagement with the pulley 15 to engagement with the pulley 42, driving movements will then be imparted to the spindle 41, thence through the pinion 35, the uni-direction clutch and the hub of the spur gear 26 to the hub 27 of the wheel 11. The driving movements thus imparted to the vehicle wheel will be at a relatively low rate of speed. During this time, the gear wheel 26 and pinion 25 with the pulley 15 secured thereto will rotate idly, but the relationship of the gearing is such that the pulley 15 will of course, rotate at a lower rate of speed than will the pulley 42, and hence the movement of the parts will be substantially negligible. When the belt 14 is in driving relation with the pulley 15 and the wheel is driven through the pinion 25 and spur gear 26 as first above described, the wheel 42, pinion 35 and spur gear 36 will, because of the presence of the uni-direction clutch, be permitted to remain idle, the sleeve 38 of the gear wheel 26 overrunning the clutch as will be well understood. The use of this clutch is desirable, because otherwise while the gear wheels 35 and 36 and the pulley 42 would merely run idle, the speed of the pulley 42 would be considerable, being greater than the speed of the pulley 15 in the proportion of the difference between the two sets of gear ratios.

For the purpose of shifting the belt 14 from its position to engage one of the said driven pulleys 15 or 42 to its position to engage the other, I have provided a belt shipper arm 43 conveniently pivoted to the bracket 30 upon the rear fork member 19 and an operating member 44 therefor, connected to the belt shipper by means of a link 45. The operating member 44 is conveniently pivoted at 46 to a bracket 47 secured to any stationary portion of the vehicle; a quadrant 48 is conveniently employed for locking the lever in its adjusted position.

The modification shown in Fig. 4 is similar to the structure of the other figures, except that it includes but a single driven belt wheel 49 and a single train of gearing including a pinion 50 secured fast to the axle of the belt wheel 49, and a spur gear wheel 51 secured fast to the hub of the wheel 11. The carrier employed is exactly similar to the carrier 16 of Fig. 2 except for the slight changes of shape due to its inclosing but one set of gearing instead of two sets, the said carrier being provided with an operating arm 24 exactly similar to the operating arm of the carrier shown in the other figures.

The modified structure shown in Fig. 5 is similar in principle and method of operation to that shown in Fig. 4, but structurally it differs somewhat in the following respect: The rear fork member 52 corresponding to the fork member 19 of the construction shown in Figs. 1 to 4, extends to, and forms a support for one of the extremities of the stationary axle 21 of the rear wheel. The carrier 53 corresponding to the carrier 16 of the other figures is, in this case, not supported in a hub in the rear fork but is supported upon one side by an extended hub 54 upon the axle, and upon the other side by a bearing portion 55 which rests upon the hub 56 of the spur gear 57. In this instance, the spur gear 57 is of considerable larger diameter than the spur gears of the other figures, whereby there is a greater proportional difference between the said spur gear and the pinion 58 with which it is in engagement. The carrier is however, arranged to turn upon its support in the same manner as the other carriers are arranged to turn, it being provided with an operating arm 59 similar to the arms 24 of the other structures through which such movements may be imparted thereto.

In all of the structures above described, it will be noted that the driven belt wheel or wheels is (or are) located outside the rear fork members upon that side of the vehicle wheel, and outside the end support for the rear stationary axle upon such side, the gear connection or connections coupling the same with the vehicle through or past the said fork member. This is advantageous as avoiding the spread of the fork members necessary where the belt wheel is disposed between the fork and the vehicle wheel, and in permitting the removal and replacement of the belt without disconnecting the fork.

The structure of Fig. 6 is similar to the structure of Fig. 5, except that the driven belt wheel 60 is arranged between the carrier and the rear wheel 11 of the vehicle and between the fork members and the vehicle wheel. In this case, I have also shown the wheel as provided with a V-groove for engagement with a belt of corresponding or similar shape instead of with a cylindrical periphery for engagement with a flat belt as in the other figures.

It will, of course, be understood that many modifications of structure and arrangement of parts may be made within the spirit and scope of my invention, and I have shown the several forms above described as illustrative of some of them. It will also be understood that while I have shown my invention as applied to a motor driven bicycle, it is by no means limited to such application but may, if desired, be applied to other forms of motor driven vehicles.

While I have described the rear axle 21 as stationary, it will, of course, be understood that the term as used is a relative one. It is stationary under normal running conditions of the vehicle and is substantially stationary at all times with respect to the rotative movements of the wheel. Actually in the construction shown it will partake of the slight rotative or oscillating movements of the carrier, because in the preferred form the carrier is actually secured fast to the said axle. In such case the connection between the opposite end of the axle and the other fork member is one which will permit the required movements as will be well understood.

What I claim is:

1. Mechanism of the class described comprising a frame, a carrier rotatably mounted thereon about a horizontal axis, two power transmitting wheels mounted to rotate upon the said carrier about a horizontal axis eccentric to, but parallel with, the axis of the carrier, a vehicle wheel mounted upon the said frame, two trains of gearing, one between each of the power transmitting wheels and the said vehicle wheel, means for applying power to either one or other of the said power transmitting wheels, and means for imparting movements of rotation to the said carrier.

2. Mechanism of the class described comprising a frame, a vehicle wheel rotatably mounted therein, a carrier rotatably mounted in the frame concentric with the said wheel, two power transmitting wheels mounted to rotate upon the carrier about an axis eccentric to, but parallel with, the axis of the carrier and the vehicle wheel, two sets of reducing gearing, one between each of the power transmitting wheels and the said vehicle wheel, means for imparting driving movements to either of the said power transmitting wheels selectively, and means for imparting movements of rotation to the said carrier.

3. The combination with a vehicle frame, a motor thereon, a drive pulley upon the said motor, and a traction wheel mounted in the said frame, of two power transmitting pulleys, gearing connecting the two said pulleys at different speed ratios with the said vehicle wheel, means for moving the said power transmitting pulleys toward and away from the motor pulley to tighten and slacken the said belt, and a belt shipper for shifting the belt from engagement with one of the said power transmitting pulleys to the other.

4. The combination with a vehicle frame, a motor thereon, a driving pulley upon the said motor, and a traction wheel mounted in the said frame, of a carrier mounted upon the said frame concentrically with the said vehicle wheel, two power transmitting pulleys mounted to rotate upon the carrier about an axis eccentric to, but parallel with, the axis of the carrier and the vehicle wheel, a pinion connected to each of the said power transmitting pulleys, one of the said pinions being larger than the other, a spur gear in engagement with the larger of the said pinions and secured fast to the said driving wheel, a spur gear in engagement with the smaller of the said pulleys, a uni-direction clutch between the latter said spur gear and a part secured to rotate with the said vehicle wheel, and means for imparting movements of rotation to the said carrier.

5. The combination with a vehicle frame, a motor thereon, a driving pulley upon the said motor, and a traction wheel mounted in the said frame, of a carrier mounted upon the said frame concentrically with the said vehicle wheel, two power transmitting pulleys mounted to rotate upon the carrier about an axis eccentric to, but parallel with, the axis of the carrier and the vehicle wheel, a belt connection between the motor pulley and either of the said power transmitting pulleys, a pinion connected to each of the said power transmitting pulleys, one of the said pinions being larger than the other, a spur gear in engagement with the larger of the said pinions and secured fast to the said driving wheel, a spur gear in engagement with the smaller of the said pulleys, a uni-direction clutch between the latter said spur gear and a part secured to rotate with the said vehicle wheel, means for imparting movements of rotation to the said carrier, whereby the said power transmitting pulleys are moved toward and away from the motor pulley to tighten or slacken the belt, and a belt shipper.

6. Mechanism of the class described comprising a vehicle wheel, a frame including a fork which straddles the said wheel, one of the said fork members being provided with a cylindrical hub, a carrier provided with a cylindrical head mounted in the said hub, a stationary axle secured at one end to the other said fork member and at its opposite end to the said carrier, the said vehicle wheel being rotatably mounted upon the said axle, a power transmitting wheel mounted in the said carrier about an axis eccentric to, but parallel with, the axis of rotation of the vehicle wheel, and reducing gearing connecting the said power transmitting wheel and vehicle wheel together.

7. Mechanism of the class described comprising a vehicle wheel, a frame including a fork which straddles the said wheel, a stationary axle for the rear wheel supported by the said frame, a motor supported by the said frame and having a driving pulley, a power transmitting pulley rotatably supported by the said frame, the axis of which is parallel with, but eccentric to, the axis of the vehicle wheel, a belt connecting the two said pulleys together, located at the exterior of the said fork, and reducing gearing for connecting the said power transmitting pulley with the said vehicle wheel.

8. Mechanism of the class described comprising a vehicle frame, an axle connected to the said frame, a traction wheel having a hub mounted to revolve about the said axle, a gear wheel mounted upon the said traction wheel, a second gear wheel adapted to transmit motion to the first said gear wheel, a pulley connected with the second said gear wheel, bearings for supporting the second said gear wheel and the said pulley, and a carrier for carrying the latter said bearings, mounted upon the aforesaid axle at one side of the said traction wheel between said traction wheel hub and the connection of said axle with said frame, and movable about the axis of the said axle so as to assume various positions in relation to the said vehicle frame.

9. Mechanism of the class described comprising a vehicle frame, an axle connected thereto, a traction wheel having a hub mounted upon the said axle to revolve about the same, a gear wheel mounted upon the said traction wheel, a second gear wheel adapted to transmit motion to the first said gear wheel, a pulley connected with the second said gear wheel, bearings for supporting the second said gear wheel and the said pulley, and a carrier for carrying the latter said bearings, the said carrier having a portion mounted directly upon the said axle within the circumference of said pulley and between said pulley and the traction wheel hub, the said carrier being movable about the axis of the said axle so as to assume various positions with relation to the said vehicle frame.

10. Mechanism of the class described comprising a vehicle frame, an axle, a traction wheel having a hub mounted upon the said axle to revolve about the same, a gear wheel mounted upon the said traction wheel, a second gear wheel adapted to transmit motion to the first said gear wheel, a pulley connected with the second said gear wheel, bearings for supporting the second said gear wheel and the said pulley, and a carrier for carrying the latter said bearings, the said carrier having a portion mounted directly upon the axle and another portion, concentric with the axis of the axle, mounted in a portion of the said vehicle frame, the said carrier being movable in the said vehicle frame about the axis of the said axle.

11. Mechanism of the class described comprising a vehicle wheel, a frame including a member upon each side of the said wheel, an axle upon which the wheel is mounted to rotate, a motor supported by the said frame and having a driving pulley, a power transmitting pulley having its axis parallel with but eccentric to the axis of the vehicle wheel, means for transmitting motion from one of the said pulleys to the other, a carrier for supporting the said power transmitting pulley, the said carrier having a part mounted directly upon the axle near one end thereof, and movable about the axis of the vehicle wheel whereby the distance between the said driving pulley and the said power transmitting pulley can be varied while the distance between the axes of the power transmitting pulley and the vehicle wheel remains unchanged, and a reducing gearing for connecting the said power transmitting pulley with the said vehicle wheel, the said reducing gearing being located upon one side of the point at which the carrier part is mounted upon the axle, the power transmitting pulley being located upon the other side thereof, and a connection between said frame and axle between said pulley and wheel.

ALDEN E. OSBORN.

Witnesses:
D. HOWARD HAYWOOD,
LYMAN S. ANDREWS, Jr.

Copies of this patent may be obtained for five cents each, by addressing the "Commissioner of Patents, Washington, D. C."